Feb. 26, 1957 H. H. TODD, JR 2,782,831
AUTOMATIC GAUGE FOR PRESS BRAKES
Filed June 15, 1955 5 Sheets-Sheet 1

INVENTOR.
HARRY H. TODD, JR.
BY
HIS ATTORNEY

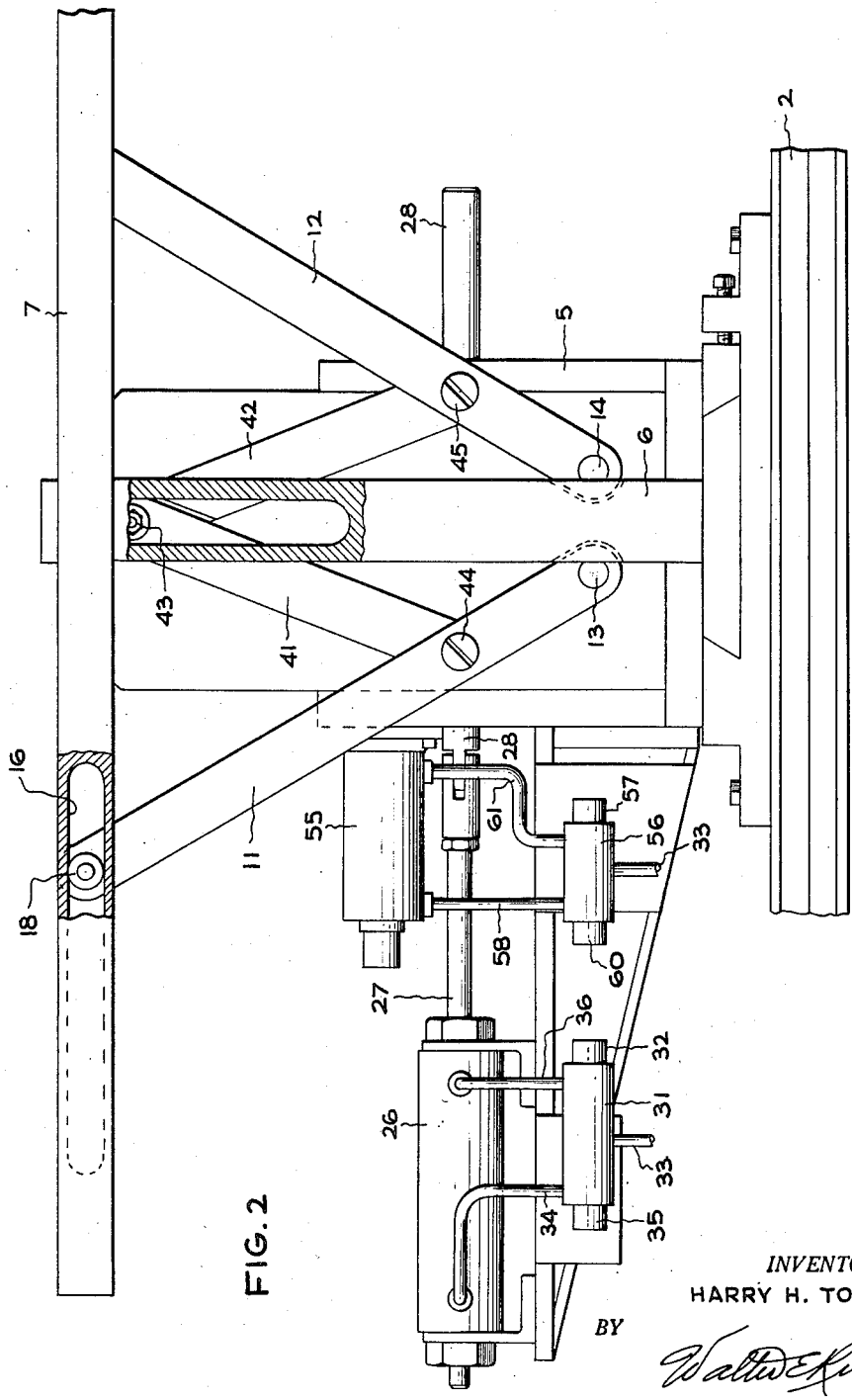

Feb. 26, 1957  H. H. TODD, JR  2,782,831
AUTOMATIC GAUGE FOR PRESS BRAKES
Filed June 15, 1955  5 Sheets-Sheet 3
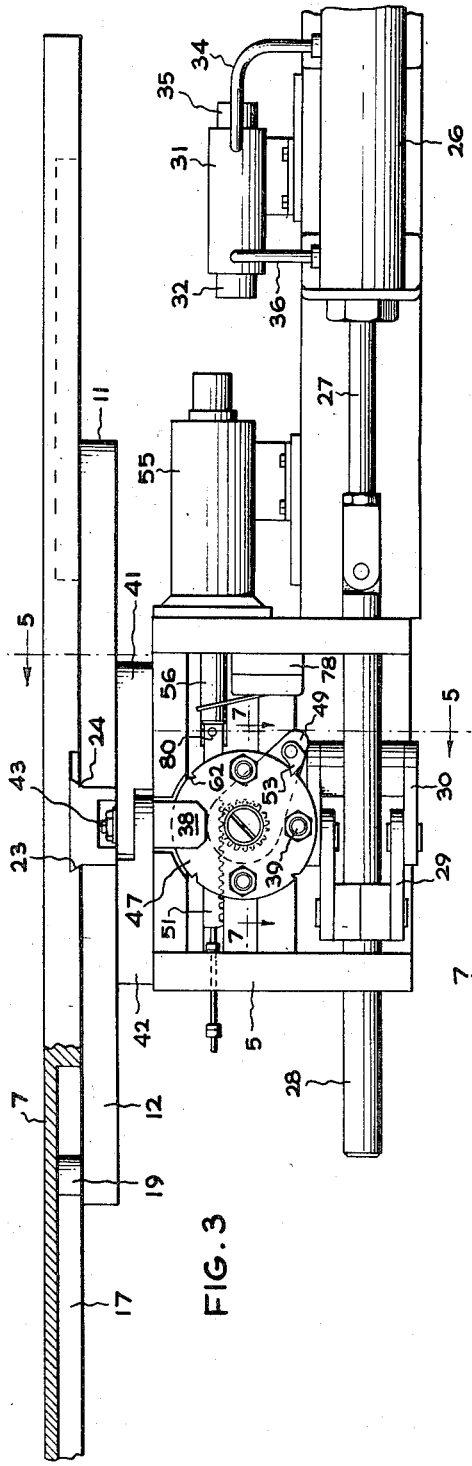
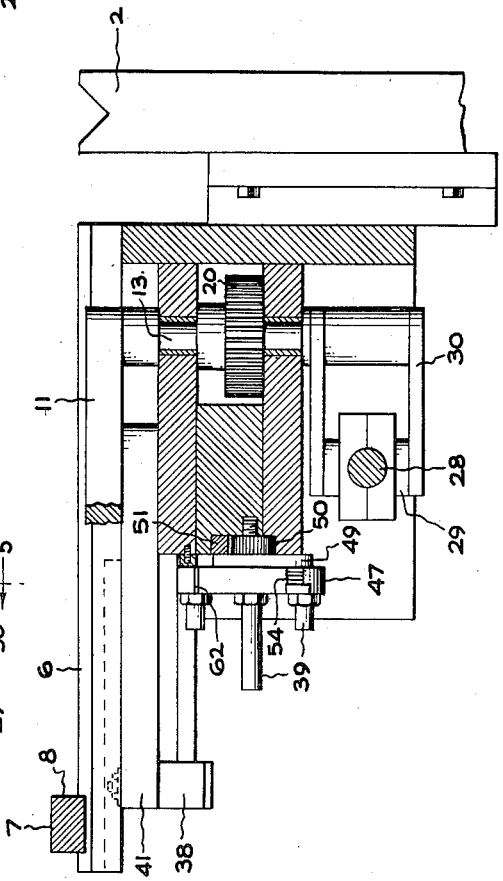
INVENTOR.
HARRY H. TODD, JR.
BY
HIS ATTORNEY INVENTOR
HARRY H. TODD, JR
BY Walter E. Hule
HIS ATTORNEY Feb. 26, 1957     H. H. TODD, JR     2,782,831
AUTOMATIC GAUGE FOR PRESS BRAKES
Filed June 15, 1955     5 Sheets-Sheet 5
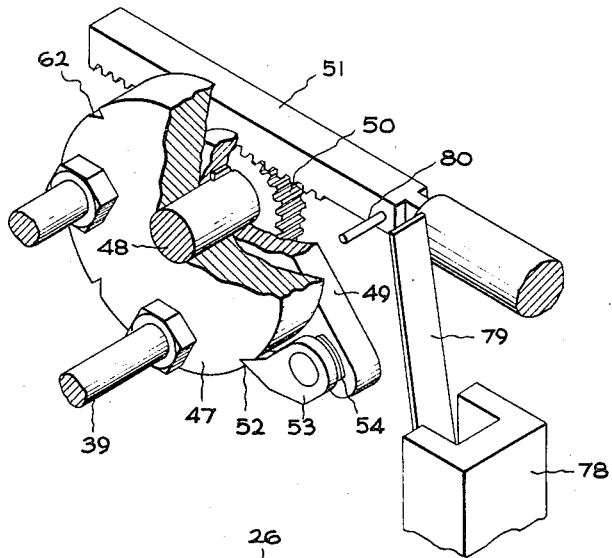
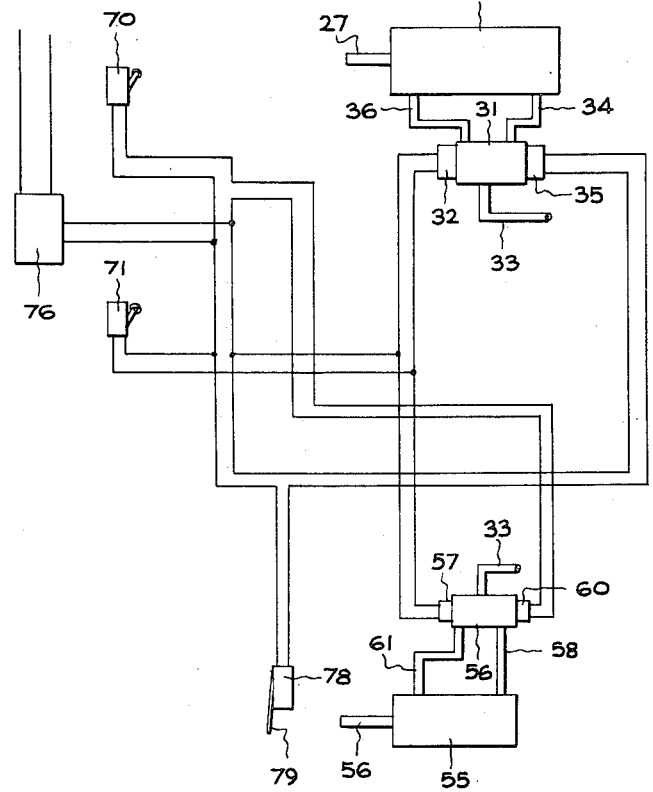
INVENTOR.
HARRY H. TODD, JR.
BY
HIS ATTORNEY United States Patent Office 2,782,831
Patented Feb. 26, 1957

2,782,831

AUTOMATIC GAUGE FOR PRESS BRAKES

Harry H. Todd, Jr., Cranbury, N. J., assignor to General Electric Company, a corporation of New York Application June 15, 1955, Serial No. 515,663

8 Claims. (Cl. 153—21)

The present invention relates to a gauge mechanism for press brakes and particularly to an automatic gauge for gauging a plurality of bends in a sheet metal piece being produced by use of a press brake.

The designs for many sheet metal parts require that several relatively close parallel bends be made adjacent the edges of these parts. When an ordinary press brake equipped with a single common set of dies is employed to make the successive bends, the bends are ordinarily made in sequence, in separate handlings of the sheet metal, and by manually changing standard gauges between operations. Because of the number of handlings and gauge changes involved, it is a relatively high labor cost operation. While various automatic gauges have been used or proposed, these gauges have usually been designed for the manufacture of a specific part so that a special gauge was required for each different type of work piece being bent or shaped on the press brake. In other words, the gauges have not been sufficiently flexible to permit their use in the manufacture of a number of different sheet metal parts.

It is a primary object of the present invention to provide an automatic gauge for a press brake by means of which a sheet metal work piece can be easily and accurately positioned in a press brake for the bending thereof at a plurality of spaced points.

Another object of the invention is to provide an automatic gauge which after each bending operation is automatically set to properly gauge the sheet metal work piece for the next bending operation.

A further object of the invention is to provide an adjustable automatic gauge for a press brake which can be employed in the manufacture of a number of sheet metal parts of different shapes.

Further objects and advantages of the present invention will become apparent as the following description proceeds and the features of novelty which characterize the invention will be pointed out with particularity in the claims annexed to and forming a part of this specification.

In carrying out the objects of the present invention, there is provided an automatic gauge adapted to be mounted on a press brake in operative position with regards to the lower fixed or stationary brake die. The gauge mechanism includes a movable gauge bar, a gauge bar supporting member and a parallel motion linkage for maintaining the gauge bar parallel to the lower brake die. The parallel motion linkage forms part of the gauge bar actuating means which effects movement of the gauge bar between a forward work gauging position and a retracted position. The proper positioning of the gauge bar in the work gauging position is obtained by a positioning means which includes a plurality of adjustable stops and means for automatically bringing each succeeding stop into operating position with regards to the gauge bar reciprocating means so that following each bending operation the gauge bar is automatically positioned for the next succeeding bending operation. The operation of the gauge bar actuating or reciprocating means and the positioning means is preferably effected in response to the reciprocating motion of the press brake upper die.

For a better understanding of the invention reference may be had to the accompanying drawing in which—

Fig. 2 is a plan view of the automatic gauge mechanism;

Fig. 3 is a rear elevational view of the gauge mechanism;

Fig. 5 is a view along line 5—5 of Fig. 3;

Fig. 6 is a detailed perspective view of a portion of the gauge positioning means;

Fig. 8 is an illustration of one form of wiring diagram which may be used to control the operation of the automatic gauge mechanism; and, Figs. 9a and b are respectively cross-sectional views of a sheet metal work piece and a finished part formed by use of the gauge of the present invention.

Figure 1:
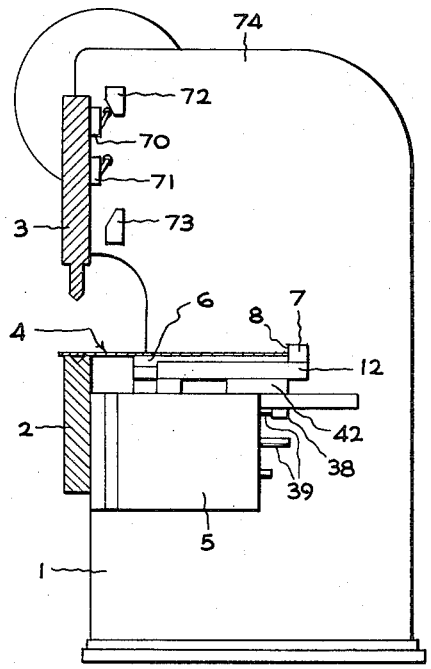
Fig. 1 is a side elevational view partially in section of a press brake provided with a gauge constructed in accordance with the present invention.

Referring to Fig. 1 of the drawing there is shown a press brake comprising a frame or support 1 on which is mounted a horizontally disposed lower stationary die 2 and a vertically-reciprocating upper die 3. These machines are generally used to bend sheet metal work pieces. In the illustrated modification the cooperating dies 2 and 3 are designed to form a right angle bend in a sheet metal work piece 4 placed on die 2 when the reciprocating die 3 moves downwardly into engagement with the lower die 2.

Figure 4:
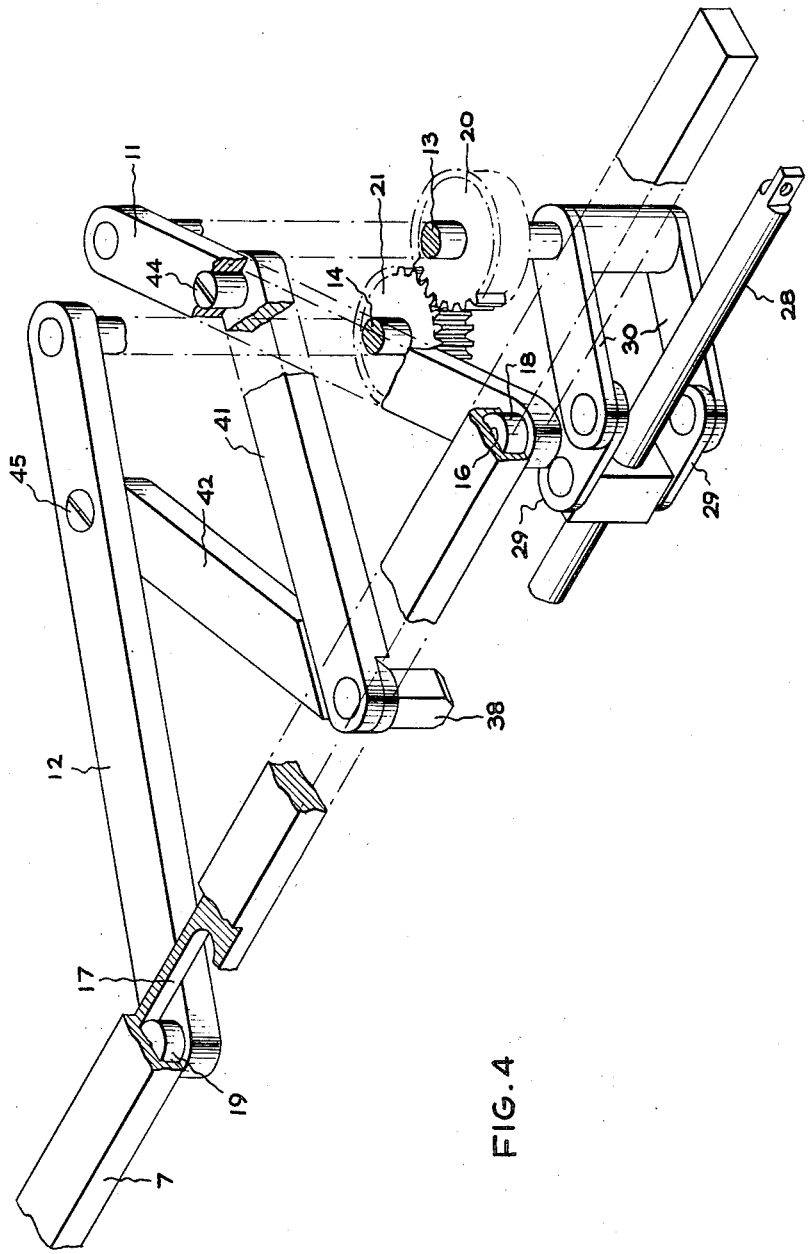
Fig. 4 is a perspective view of a portion of the gauge mechanism shown in Fig. 2.

The automatic gauging mechanism of the present invention is designed to facilitate the positioning of the sheet metal work piece 4 between the dies 2 and 3 in such a manner that a number of bends can successively be made in the work piece 4 in a series of operations of the press brake. As is shown more clearly in Figs. 2, 3 and 4, this gauge comprises a frame 5 adapted to be mounted on and supported by the press brake frame. The gauge frame 5 includes a gauge bar supporting member 6 which extends perpendicularly from the rear portion of the lower die 2 and which supports a gauge bar 7 slidably positioned on the support 6. The gauge is supported on the press brake so that the gauge bar 7 is arranged in about the same horizontal plane as the upper edge of the stationary die 2. When the work piece 4 is fed to the press brake from the front, the forward edge 8 of the work piece engages the gauge bar 7 to position the work piece in the desired location between the cooperating dies 2 and 3. The position of the gauge bar 7 relative to the press brake dies, of course, determines the location of the bend formed in the work piece 4 by the downward movement of the movable die 3.

In order to provide means for maintaining the gauge bar 7 parallel to the lower die 2 in the movement thereof to different gauging positions there is provided a parallel motion linkage comprising a pair of diverging arms 11 and 12 respectively secured at one end to shafts 13 and 14. The opposite ends of the arms 11 and 12 slidably engage the gauge bar 7 on opposite sides of the gauge bar support 6. For this purpose there are provided a pair of slots 16 and 17 on the lower surface of the gauge bar 7 and pins 18 and 19 mounted on the ends of the arms 11 and 12 which are received in the respective slots in sliding engagement therewith.

The oscillation of the arms 11 and 12 about their pivot points as represented by shafts 13 and 14 effects movement of the gauge bar 7 towards or away from the lower die 2 in parallel relationship with that die. To assure the same angular rotation or oscillation of arms 11 and 12, the gauge bar actuating means also includes a pair of intermeshed identical gears 20 and 21 secured respectively to the shafts 13 and 14 whereby the shafts are synchronized in the rotation. The interconnection of the shafts 13 and 14 by means of the gears 20 and 21 results in an operation in which when either of the shafts is rotated in one direction, the other will rotate through the same angle in the opposite direction thereby maintaining the desired parallelism between the die 2 and the gauge bar 7 driven by the arms 11 and 12.

In order to maintain the gauge bar 7 in a centered position with regards to the support 6 there is provided a dove-tailed slot 23 on the lower side of the gauge bar 7 which slidably engages the dove-tailed upper portion 24 of the guide bar 6.

Limited rotation of the inter-connected shafts 13 and 14 within the operating limits of the parallel motion linkage arrangement is effected by means of an air cylinder 26 including a piston rod 27 and a connecting rod 28 pivotally connected by links 29 and rocker arm 30 to the shaft 13. The operation of the cylinder 26 is under control of the three-way solenoid valve 31. The energization of the solenoid coil 32 effects operation of the valve 31 so that compressed air from the high-pressure air line 33 is introduced through the conduit 34 into the rearward part of the air cylinder 26 whereby the piston rod 27 and connecting rod 28 move to the right as viewed in Fig. 2 thus imparting rotative motion to the shafts 13 and 14 so that the arms 11 and 12 move towards one another and move the gauge bar 7 away from the die 2. Upon energization of the solenoid valve coil 35 the air from the high pressure line 33 is introduced through the conduit 36 into the forward end of the air cylinder 26 thus moving the gauge bar in the opposite direction towards the die 2.

Movement of the gauge bar 7 towards the die 2 or in other words to a work gauging position is limited by contact of the stop engaging member 38 with one of the adjustable stops 39. A plurality of stops 39 are provided in order that the gauge bar 7 may be set at different positions relative to the die 2 for successively performing a plurality of bending operations on the work piece 4.

In order to distribute the stopping stress between the two arms 11 and 12, the stop engaging member 38 is preferably connected to the arms by means of a pair of links 41 and 42 which are pivotally joined together by means of a pin 43 forming an extension of the stop engaging member 38 and which have their opposite ends respectively pivotally connected to the arms 11 and 12 at points 44 and 45 equidistant from the shafts 13 and 14.

The various stops 39 are arranged to be moved in sequence into operative position with regards to the member 38 with each operation of the press brake. In the modification of the invention as shown in the drawing a plurality of the stops 39 are arranged adjacent the periphery of a turret 47 suitably supported on the gauge frame 5.

Figure 7:
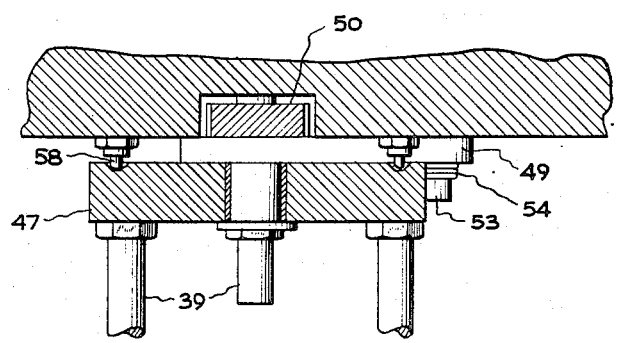
Fig. 7 is a view substantially along line 7—7 of Fig. 5.

In order to rotate the turret 47 through a predetermined angle and bring the next stop into operative position with regards to the stop engaging member 38, the turret is rotatably supported on a shaft 48 to which are keyed a pawl arm 49 and a pinion gear 50 driven by a rack 51. A plurality of spaced ratchet teeth 52 equal in number to the number of stops 39 provided on the turret 47 are provided about the periphery of the turret and are adapted to be engaged by the pawl 53 pivotally connected to the end of the pawl arm 49 and biased by means of a spring 54 into engagement with the surface of the turret 47. The rack 51 is driven by means of a second air cylinder 55 including a piston rod 56 pivotally connected to one end of the rack and the operation of the air cylinder 55 is under the control of the three-way solenoid valve 56. Energization of the coil 57 of this solenoid valve introduces compressed air into the rearward portion of the air cylinder 55 through the conduit 58 thereby causing the pinion 50 and shaft 48 to rotate in a counterclockwise direction as viewed in Fig. 6. During this rotational movement the turret 47 is held stationary by means of the detents 58 (Fig. 7) while the pawl 53 moves in a counter- clockwise direction about the stationary turret 47 from engagement with one ratchet tooth 52 to a point past the next succeeding ratchet tooth.

Subsequent energization of the solenoid 60 introduces high pressure air through the conduit 61 into the forward portion of the air cylinder 55 thereby moving the rack 51 in the opposite direction and rotating the shaft 48 and the pawl 53 in a clockwise direction. During this movement of the rack 51 the pawl 53 engages one of the ratchet teeth 52 and moves the turret through an angle sufficient to bring the next succeeding stop member 39 into an operative position with regards to the stop engaging member 38.

For the purpose of obtaining the desired sequential operation of the cylinders 26 and 55 so that the gauge bar 7 will be set automatically for the making of a number of separate bends in a single sheet metal work piece, timing means are provided for controlling the operation of the valves 31 and 56. The timing circuit is shown in Fig. 8 of the drawing and essentially comprises two normally open switches 70 and 71 which can be mounted on the rear surfaces of the vertically reciprocating upper die 3. These switches are respectively adapted to be tripped or closed by switch tripping dogs 72 and 73 mounted on the side portion 74 of the press brake. As will be evident from a consideration of Fig. 1 of the drawing the switch 70 is adapted to be closed by the dog 72 when the die 3 is in its upper position while the switch 71 is closed by the dog 73 when the die 3 moves to its lower bending position.

Referring again to Fig. 8 of the drawing, it will be seen that when switch 70 is closed by movement of the die 3 to its raised position, the solenoid coil 60 is energized by a source of power such as the transformer 76 with the result that valve 56 introduces compressed air into the forward portion of the turret controlling air cylinder 55 through the conduit 61 causing the pawl 53 to rotate the turret 47 and bring the next succeeding stop into operating position with reference to stop engaging member 38. The switch 70 is also one of two switches controlling the energization of solenoid coil 35 of valve 31, the energization of which causes the gauge bar actuating means to move the gauge bar forwardly towards the die 2 and to the desired work gauging position as determined by contact of the stop engaging member 38 with one of the stops 39. In order to delay the resetting of the gauge bar until the next succeeding stop 39 has been brought into the proper operating position by rotation of turret 47, there is provided in the circuit which controls the energization of the solenoid coil 35 a second switch 78 having an operating arm 79. The operation of the switch 78 is effected by movement of the rack 51 forming part of the turret operating means and carrying a switch operating pin 80 adapted to contact the switch operating arm 79 and close the switch 78 only after the turret 47 has been rotated by the rack to bring a new stop into operating position. By this arrangement in which both switches 70 and 78 control the energization of the solenoid coil 35, the movement of the gauge bar to the work gauging position is definitely delayed until the desired stop means has been brought into the proper operating position. Upon energization of the solenoid coil 35 which effects movement of the gauge bar 7 forwardly into the work gauging position, the sheet metal work piece is placed by the press operator against the gauge bar for proper bending of the work piece.

During the downward travel of the vertical die 3 to make the bend, switch 70 is opened and the tripping dog 73 effects the closing of the switch 71 whereupon the solenoid coils 32 and 57 are both energized. The energization of the coil 32 effects reverse operation of the air cylinder 26 moving the gauge bar 7 away from the work engaging position to a retracted position while the energization of the solenoid coil 57 rotates the pawl 53 along the surface of the turret into a position to engage the next succeeding ratchet tooth in which position the pawl 53 is ready to rotate the turret 47 upon the subsequent closing of switch 70 by movement of the die 3 to its raised position.

Figure 9A:
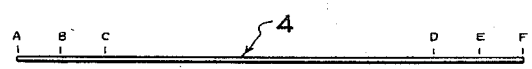
Figure 9B:
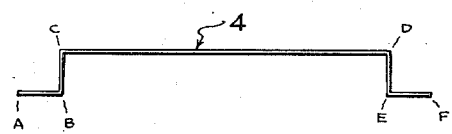

The advantages of the present invention will become more apparent from a consideration of the manner in which the gauge can be employed in the manufacture of sheet metal articles. In Fig. 9a there is shown in cross-section a piece of sheet metal which is intended to be bent to the configuration shown in Fig. 9b i. e. by bending the sheet metal at points B, C, D and E. This series of operations requires four separate bending operations so that four stops 39 are provided on the turret 47. If the first bend to be made is the bend B, the sheet will be placed in the press with one of the gauge bar stops 39 in operative position and so adjusted that the gauge bar in its work gauging position will be spaced a distance from the die 2 equal to the distance B—F on the sheet of Fig. 9a. The press is then operated and the portion A—B is bent at right angles to the main portion of the sheet. During the time that the upper die 3 goes through one cycle of operation, the gauging or positioning means is reset to bring into operation a second stop 39 arranged to stop the gauge bar a distance B—E from the die 2. At the same time and while the die 3 is in its raised position the operator turns the sheet about an axis perpendicular to its surface and places the bend B against the gauge bar. Upon operation of the press brake bend E is then formed in the sheet and the resultant structure is of U-shaped cross section with the upturned edge portions A—B and E—F. Following the formation of the bend E and while the die 3 is in its upper position the entire sheet metal structure is turned over so that it rests on its opposite face with the bent portions A—B and E—F extending downwardly. During the making of the bend E the automatic gauge mechanism again resets to bring into operative position a third of the stops 39 adjusted so that when the gauge bar is returned to its gauging position, the distance between the die 2 and the gauge bar will be equal to the distance B—D. As the sheet structure is then inserted into the brake the bend B will engage the gauge bar 7 placing the point D in bending position on the die 2. During formation of the bend at point D, the fourth of the stops 39 is brought into operative position with regards to the stop engaging member 38. This stop is adjusted so that the total distance between the gauge bar 7 and the die 2 will be the sum of the distances C—D and E—F since before making this bend the sheet is again rotated about the axis normal to its face so that the edge F will be in contact with the gauge bar when the sheet is inserted into the brake. The final closing of the press brake forms the bend C resulting in the structure shown in Fig. 9b.

From the above it will be seen that by means of the present automatic gauging mechanism a number of different bends can be made in the same number of successive operations on a sheet metal work piece even though each bend may require a gauging position of the gauge bar different from either the preceding or following gauging position. It will be obvious, of course, that while this example has been given employing the gauge bar directly to gauge the work the gauge bar may be drilled or tapped to take various standard gauging plates or pins by means of which the working distance between the die and the gauging surface or the gauge height can be changed to accommodate different sizes of work pieces. It is, of course, also possible to mount the entire gauge assembly on the press plate so that it may be adjusted horizontally or vertically to facilitate the manufacture of sheet metal articles of various types.

While there has been shown and described a specific embodiment of the invention, it is to be understood that the invention is not limited to the particular construction shown and described and it is intended by the appended claims to cover all modifications within the spirit and scope of the invention.

What I claim as new and desire to secure by Letters Patent of the United States is:

1. An automatic gauge for a press brake including a fixed lower die and a vertically-reciprocating upper die comprising a frame adapted to be mounted on said brake and including a gauge bar supporting member, a gauge bar slidably supported on said member, reciprocating means including a parallel motion actuating means for periodically advancing and retracting said bar in parallel relationship to said lower die, positioning means including a turret having a plurality of spaced stops mounted thereon for limiting the advancing movement of said gauge bar and means operated by said upper die for effecting operation of said reciprocating means and said positioning means.

2. An automatic gauge for a press brake including a stationary lower die and a vertically-reciprocating upper die comprising a frame adapted to be mounted on said brake and including a gauge bar supporting member, a gauge bar slidably supported on said member, reciprocating means including a parallel motion actuating means for periodically advancing and retracting said bar in parallel relationship to said lower die, positioning means including a turret having a plurality of spaced stops mounted thereon for limiting the advancing movement of said gauge bar and timing means operated by reciprocating movement of said upper die for controlling the operation of said reciprocating means and said positioning means for retracting said gauge bar and rotating said turret to bring one of said stops into operative relationship with said gauge bar positioning means as said upper die approaches its lower position and for advancing said gauge bar when said upper die approaches its upper position.

3. An automatic gauge for a press brake including a fixed lower die and a vertically reciprocating upper die comprising a frame adapted to be mounted on said brake and including a gauge bar supporting member, a gauge bar slidably supported on said member, reciprocating means including a parallel motion actuating means for periodically advancing and retracting said bar in parallel relationship to said lower die, positioning means including a plurality of sequentially-positioned stops for limiting the advancing movement of said gauge bar and timing means operated by said upper die for controlling the operation of said reciprocating means and said positioning means for retracting said gauge bar and to bring one of said stops into operative relationship with said gauge bar positioning means as said upper die approaches its lower position and for advancing said gauge bar when said upper die approaches its upper position.

4. A gauge for a press brake having a fixed lower die and a reciprocating upper die, said gauge comprising a frame adapted to be mounted on said brake including a gauge bar supporting member, a gauge bar slidably supported on said member, a parallel motion actuating means for maintaining said bar parallel to said lower die during movement thereof between a forward work gauging position and a retracted position, said actuating means including a pair of vertically arranged shafts, arms fixedly mounted at one end thereof on each shaft, the other ends of said arms being spaced apart a greater distance than the shaft ends and slidably engaging said gauge bar for longitudinal movement relative to said bar, a pair of links pivotally connected at one end thereof, the other ends of said links being pivotally connected to said arms at points equidistant from the respective fixedly mounted ends of said arms, and intermeshing gears on each of said shafts whereby rotational movement of one of said shafts is transmitted to the other said shafts to effect simultaneous rotation of said arms in opposite directions to move said bar relative to said lower die, and means for limiting the movement of said bar in one direction comprising a stop engaging member mounted adjacent the point at which said links are pivotally connected and adapted to engage said stop upon movement of said bar in said one direction.

5. A gauge for a press brake having a fixed lower die and a reciprocating upper die, said gauge comprising a frame adapted to be mounted on said brake including a gauge bar supporting member, a gauge bar normal to and slidably supported on said member, a parallel motion actuating means for maintaining said bar parallel to said lower die during movement thereof between a forward work gauging position and a retracted position, said actuating means including a pair of vertically arranged shafts, arms fixedly mounted at one end thereof on each shaft, the other ends of said arms extending on opposite sides of said supporting member and being spaced apart a greater distance than the shaft ends and slidably engaging said gauge bar for longitudinal movement relative to said bar, a pair of links pivotally connected at one end thereof, the other ends of said links being pivotally connected to said arms at points equidistant from the respective fixedly mounted ends of said arms, and intermeshing gears on each of said shafts whereby rotational movement of one of said shafts is transmitted to the other of said shafts to effect simultaneous rotation of said arms in opposite directions to move said bar relative to said lower die, and means for limiting the movement of said bar in one direction comprising a stop engaging member mounted adjacent the point at which said links are pivotally connected and adapted to engage said stop upon movement of said bar in said one direction.

6. A gauge for a press brake having a fixed lower die and a reciprocating upper die, said gauge comprising a frame adapted to be mounted on said brake including a gauge bar supporting member, a gauge bar slidably supported on said member, a parallel motion actuating means for maintaining said bar parallel to said lower die during movement thereof between a forward work gauging position and a retracted position, said actuating means including a pair of vertically arranged shafts, arms fixedly mounted at one end thereof on each shaft, the other ends of said arms being spaced apart a greater distance than the shaft ends and slidably engaging said gauge bar for longitudinal movement relative to said bar, a pair of links pivotally connected at one end thereof, the other ends of said links being pivotally connected to said arms at points equidistant from the respective fixedly mounted ends of said arms, and intermeshing gears on each of said shafts whereby rotational movement of one of said shafts is transmitted to the other of said shafts to effect simultaneous rotation of said arms in opposite directions to move said bar relative to said lower die, means for limiting the forward movement of said bar comprising a turret including a plurality of stops, a stop engaging member mounted adjacent the point at which said links are pivotally connected and adapted to engage one of said stops upon forward movement of said bar, and means for effecting rotation of said turret to bring another of said stops into operating position when said bar is moved towards a retracted position.

7. A gauge for a press brake having a fixed lower die and a reciprocating upper die, said gauge comprising a frame adapted to be mounted on said brake including a gauge bar supporting member, a gauge bar slidably supported on said member, a parallel motion actuating means for maintaining said bar parallel to said lower die during movement thereof between a forward work gauging position and a retracted position, said actuating means including a pair of vertically arranged shafts, arms fixedly mounted at one end thereof on each shaft, the other ends of said arms being spaced apart a greater distance than the shaft ends and slidably engaging said gauge bar for longitudinal movement relative to said bar, a pair of links pivotally connected at one end thereof, the other ends of said links being pivotally connected to said arms at points equidistant from the respective fixedly mounted ends of said arms, intermeshing gears on each of said shafts whereby rotational movement of one of said shafts is transmitted to the other of said shafts to effect simultaneous rotation of said arms in opposite directions to move said bar relative to said lower die, means for limiting the forward movement of said bar comprising a turret including a plurality of adjustable stops thereon, a stop engaging member mounted on said parallel motion means and adapted to engage one of said stops upon forward movement of said bar, rotating means for effecting rotation of said turret to bring each successive stop into operating position with regards to said stop-engaging member and timing means operated by said movable die for controlling the operation of both said actuating means and said rotating means and to effect movement of said bar to its forward position in which said stop engaging member contacts one of said stops when said movable die approaches its upper position and movement of said bar to its retracted position and rotation of said turret to bring a second stop into operative position with regards to said stop engaging member when said movable die approaches its lower position, and means for delaying forward movement of said bar until rotation of said turret to bring said second stop into operative position is completed.

8. A gauge for a press brake having a fixed lower die and a reciprocating upper die, said gauge comprising a frame adapted to be mounted on said brake including a gauge bar supporting member, a gauge bar slidably supported at its mid-section on said member and having longitudinal slots on opposite sides of its mid-section, a parallel motion actuating means supported on said frame for maintaining said bar parallel to said lower die during movement thereof between a forward work gauging position and a retracted position, said actuating means including a pair of vertically arranged shafts, arms fixedly mounted at one end thereof on each shaft, the other ends of said arms extending on opposite sides of said bar supporting member and being spaced apart a greater distance than the shaft ends and slidably engaging the respective slots in said gauge bar for longitudinal movement relative to said bar, a pair of links pivotally connected at one end thereof, the other ends of said links being pivotally connected to said arms at points equidistant from the respective fixedly mounted ends of said arms, intermeshing gears on each of said shafts whereby rotational movement of one of said shafts is transmitted to the other of said shafts to effect simultaneous rotation of said arms in opposite directions to move said bar relative to said lower die, means for controlling the forward movement of said bar comprising a turret including a plurality of adjustable stops thereon, a stop engaging member mounted on said parallel motion means and adapted to engage one of said stops upon forward movement of said bar, rotating means for effecting rotation of said turret to bring each successive stop into operating position with regards to said stop-engaging member and timing means operated by said movable die for controlling the operation of both said actuating means and said rotating means and to effect movement of said bar to its forward position in which said stop engaging member contacts one of said stops when said movable die approaches its upper position and movement of said bar to its retracted position and rotation of said turret to bring a second stop into operative position with regards to said stop engaging member when said movable die approaches its lower position, and means for delaying forward movement of said bar until rotation of said turret to bring said second stop into operative position is completed.

References Cited in the file of this patent

UNITED STATES PATENTS

| | | |
|---|---|---|
| 377,780 | Sagendorph | Feb. 14, 1888 |
| 2,265,234 | Jensen | Dec. 9, 1941 |
| 2,627,890 | Lloyd et al. | Feb. 10, 1953 |
| 2,669,276 | Humphrey | Feb. 16, 1954 |
| 2,701,656 | French | Feb. 8, 1955 |